3,038,122
PASSIVE DETECTOR WITH AMBIGUOUS PULSE ELIMINATOR
Robert D. Tollefson, Cedar Rapids, Iowa, and Jefferson R. Wilkerson, Los Altos, Calif., assignors, by mesne assignments, to the United States of America as represented by the Secretary of the Navy
Filed Oct. 10, 1958, Ser. No. 766,631
13 Claims. (Cl. 328—137)

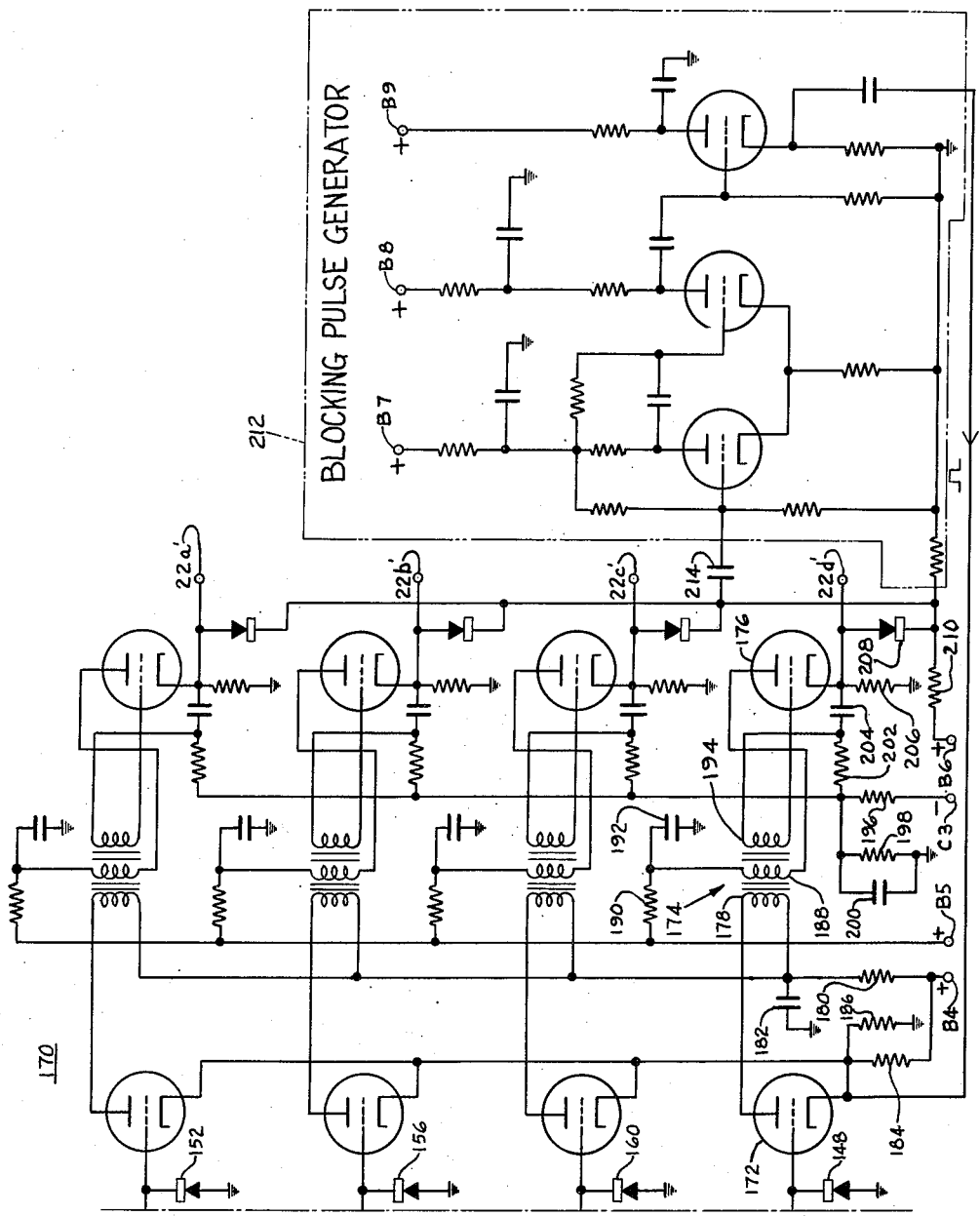

This invention concerns a wide open type of detector system for detecting pulse signals occurring within a selected range of frequency, azimuth angle or zenith angle relative to the detector, which selected range is divided into particular segments by the detector, and identifying the segment of the selected range in which each detected signal occurs and also to an ambiguity eliminator for use in the detector system to ensure that the system does not identify more than one segment of the selected range in response to one detected signal regardless of intensity and regardless of straddling by the signal of the crossover between a pair of consecutive segments of the selected range.

This invention has utility in the passive detection of operating radars. Heretofore, passive detection of operating radars has been based on scanning techniques in which a directional antenna repeatedly scans the field of interest, e.g., the horizon, for signals while a frequency selective receiver connected to the antenna sweeps across the frequency spectrum of interest. Under these conditions, there is considerable probability that the signal will not be present at the time the antenna and receiver are ready to receive it. Additionally, where the signal is radiated from a radar having a sweeping antenna, a triple coincidence is required to intercept the signal. Under these conditions, the probability of intercepting signals from operating radars is very low.

The probability of interception is greatly increased by the use of a nonscanning wide-open system. A directionally sensitive type of nonscanning detector system may include a plurality of broadband directional antennas each of which feeds a respective broadband receiver. The directional antennas, each having substantially identical radiation patterns, are secured to a support so that their patterns are equally spaced over the angular range of interest dividing the range into segments. The segments are sequential and contiguous segments overlap so that there are no gaps where signals would not be detected. An output from one of the broadband receivers indicates that a signal has been received from the segment of the angular range corresponding thereto. A frequency sensitive type of nonscanning detector system analogous to the above-described directionally sensitive system may include an omnidirectional (relative to the range of interest) antenna feeding a plurality of distinct narrow band receivers. The narrow band receivers have substantially equal width frequency response curves, such that consecutive response curves overlap to receive signals from respective frequency segments of a frequency range of interest; the frequency segments are sequential and contiguous segments overlap so that there are no gaps where signals would not be detected and all of the frequency segments together comprise the frequency range of interest. If direction sensitive and frequency sensitive systems are used together, the separate information on direction and frequency is combined with the use of coincidence circuitry to identify operating radars in terms of direction and frequency.

Wide-open reception presents the problem of maintaining the accuracy of the information in the presence of pulse signals of very different amplitude levels. Post-receiver signal processing is required to prevent a strong signal from spreading an indication over several receiving channels. Also, a pulse signal that straddles the crossover of two segments activates the receiver channels corresponding to the two segments. It is essential that one pulse signal not activate more than one detector channel in the above-described type of wide-open nonscanning detector system else the information provided by the detector would be ambiguous.

An object of this invention is to provide a wide-open nonscanning pulse signal passive detector of the type having a plurality of receiving channels sensitive to a corresponding plurality of overlapping contiguous sequential segments of a selected range of interest wherein one pulse signal activates not more than one receiving channel and whenever a signal straddles any two contiguous channels, a predetermined one of the two channels is consistently activated.

A further object is to provide a pulse signal passive detector in accordance with the preceding object wherein the range of interest is a particular frequency range, a particular azimuth range, or a particular zenith range.

A further object is to provide an ambiguity eliminator for use with a series of monopulse sources arranged in a sequence for providing in response to a pulse from one only of said sources an output pulse corresponding to that source, and for providing in response to two coincident pulses from two adjacent sources in the sequence an output pulse corresponding to the one of said two sources which is foremost in a predetermined direction along the sequence.

A further object is to provide an ambiguity eliminator in accordance with the preceding object for providing in response to three coincident pulses from three adjacent sources in the sequence an output pulse corresponding to the pulse from the central one of the three sources.

Other objects and many of the attendant advantages of this invention will be readily appreciated as the same becomes better understood by reference to the following detailed description when considered in connection with the accompanying drawings wherein:

FIGS. 3 and 4 are adjacent portions of a schematic circuit diagram of an embodiment of the ambiguity eliminator comprising part of the systems shown in FIGS. 1 and 2.

Figure 1:
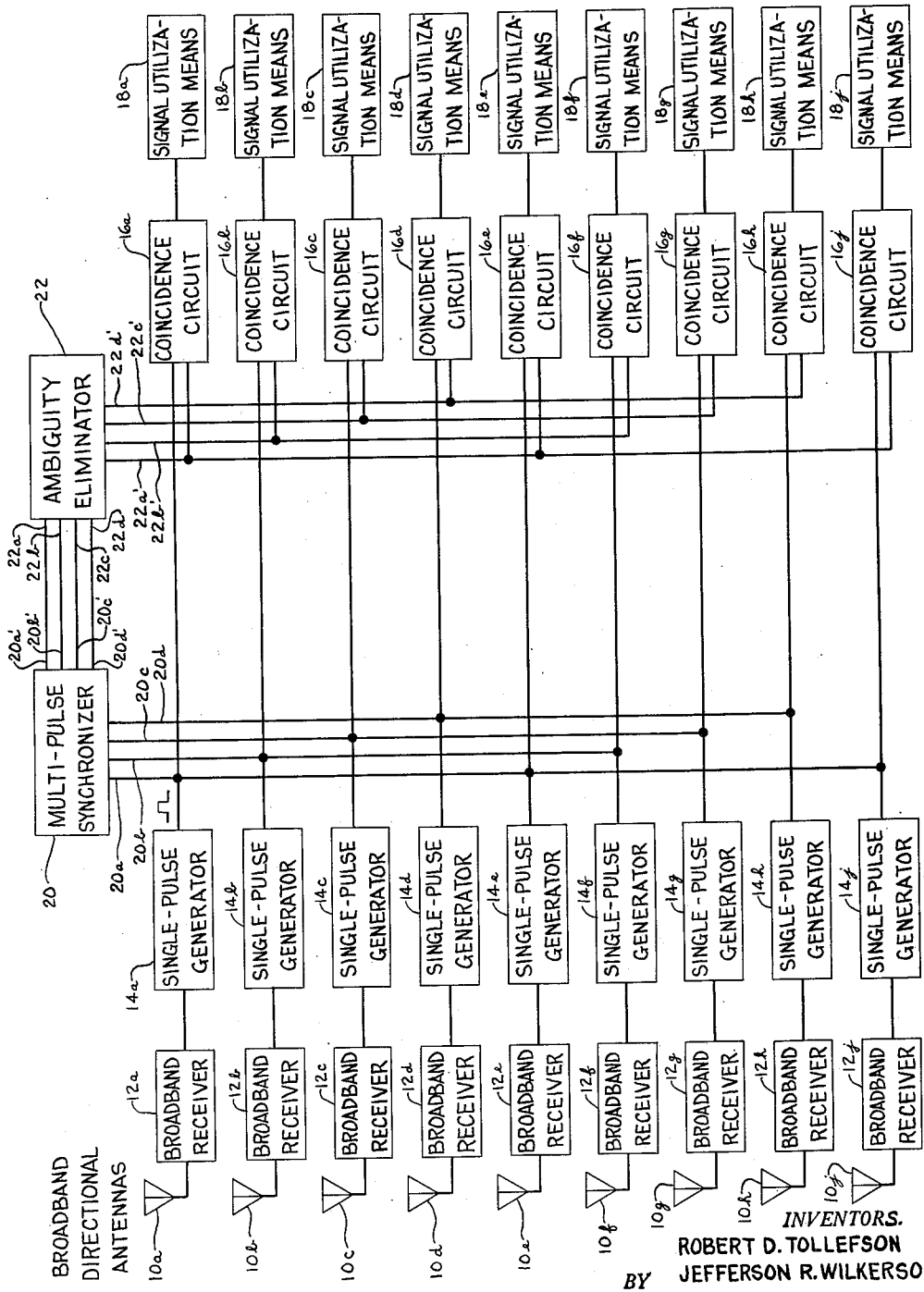
FIGS. 1 and 2 illustrate directionally sensitive and frequency sensitive passive pulse detector systems respectively in accordance with this invention.

The nonscanning wide-open detector system shown in FIG. 1 includes a series of substantially identical broadband directional antennas 10a–10j secured to a support base, not shown, so that their radiation patterns are evenly spaced over a particular angular range of interest. The radiation patterns are of sufficient width so that contiguous ones overlap to preclude gaps where signals would not be detected. If the angular range of interest covers 360 degrees, the number of antennas is an integral multiple of four as will be apparent from succeeding parts of this description. A series of broadband receivers 12a–12j are coupled to the antennas 10a–10j respectively and a series of single pulse generators 14a–14j e.g., blocking oscillators, are coupled to the broadband receivers 12a–12j. When a signal pulse passes through an antenna and its receiver, it triggers the respective single pulse generator which delivers a pulse of predetermined width and height. It one signal pulse passes through two or three adjacent receiver channels, the single pulse generators in those channels each generate a pulse, the generated pulses being substantially identical and substantially coincident. Because the signal pulse lengths of the type which this invention relates to are extremely short, the possibility of two distinct signal pulses originating at separate sources arriving at the antennas in coincidence is remote.

A series of substantially identical coincidence circuits 16a–16j each having two inputs and one output are coupled through one of their inputs to the single pulse generators 14a–14j and a series of substantially identical signal utilization means 18a–18j are coupled to the output sides of the coincidence circuits. The coincidence circuits may be any one of the types well known in the art e.g., a coincidence circuit wherein a tube with two grids, and normally cut off, is rendered conductive when positive signals are coupled into both grids in coincidence. A multipulse synchronizer 20 having four inputs 20a–20d and four corresponding outputs 20a'–20d' is coupled to the output sides of the signal-pulse generators 14a–14j in a manner such that input terminal 20a is coupled to the receiver channel corresponding to antenna 10a and to every fourth channel thereafter, namely, the channels corresponding to antennas 10e and 10j; input terminal 20b is coupled to the channels corresponding to antennas 10b and 10f and every succeeding fourth channel where the system includes more channels than shown; input terminal 20c is coupled to the channels corresponding to antennas 10c and 10j and every succeeding fourth channel; input terminal 20d is coupled to the channels corresponding to antennas 10d and 10h and every succeeding fourth channel. The multi-pulse synchronizer is operative to synchronize the leading edges of two or three pulses arriving at the inputs thereof substantially in coincidence and to deliver corresponding pulses with synchronized leading edges at the corresponding outputs of the synchronizer; if a pulse arrives at one input only of the synchronizer, there is a pulse delivered at the corresponding output of the synchronizer. The multi-pulse synchronizer is of the type described in U.S. patent application, Serial Number 721,616, filed March 14, 1958, by Robert D. Tollefson and Jefferson R. Wilkerson for Multi-Pulse Synchronizer, and assigned to the assignee of this invention.

An ambiguity eliminator 22 (described in detail in succeeding portions of this description) having four inputs 22a–22d and four outputs 22a'–22d' corresponding thereto is coupled at its input side to the output side of the multi-pulse synchronizer and is coupled at its output side to one of the two inputs of each of the coincidence circuits 16a–16j; output 22a' is coupled to coincidence circuits 16a, 16e, 16j and every succeeding fourth one thereafter, if any; output 22b' is coupled to coincidence circuits 16b, 16f and every succeeding fourth one thereafter; output 22c' is coupled to coincidence circuits 16c, 16g and every succeeding fourth one thereafter; output 22d' is coupled to coincidence circuits 16d, 16h and every succeeding fourth one thereafter.

If necessary, a delay means is included in each of the electrical couplings between single-pulse generators 14 and coincidence circuits 16 to take into account the delay in the multi-pulse synchronizer 20 and ambiguity eliminator 22 so that the two inputs to a coincidence circuit are in fact coincident. For the sake of simplicity, the delay means is not shown, being an expedient obvious to one skilled in the art.

When a signal pulse arrives at the system shown in FIG. 1 and exceeds a predetermined minimum amplitude corresponding to the input threshold of the receiver channels, it may pass through one channel, or two consecutive channels, or three consecutive channels. It has been found that the channels can be designed so that one signal does not pass through more than three channels. When a signal pulse passes through only the channel including the antenna 10a, the pulse generated by the single pulse generator 14a divides and in part appears at one of the inputs of the coincidence circuit 16a and the remaining part passes through the multi-pulse synchronizer 20, the ambiguity eliminator 22 and appears at the other input of coincidence circuit 16a. The coincidence circuit delivers an activation pulse to signal utilization means 18 as a consequence of both its inputs being pulsed in coincidence. The very same thing occurs when a signal pulse passes through one only of the other channels. When a signal pulse passes through two consecutive channels, the channels that include antennas 10a and 10b, the single pulse generators 14a, 14b each generate a pulse which pulses in part appear at one input of each of the coincidence circuits 16a and 16b respectively and in part pass through the multi-pulse synchronizer and appear at the inputs 22a and 22b of ambiguity eliminator 22. When coincident pulses appear at the inputs 22a and 22b, the ambiguity eliminator delivers an output pulse at the output 22a' thereof only whereby only coincidence circuit 16a receives overlapping pulses at its two inputs. As a result, signal utilization means 18a is activated while signal utilization means 18b is not activated. Ambiguity eliminator delivers an output pulse at 22a' only when coincident pulses appear at 22a and 22b; it delivers an output pulse at 22b' only when coincident pulses appear at 22b and 22c; it delivers an output pulse at 22c' only when coincident pulses appear at 22c and 22d; it delivers an output pulse at 22d' only when coincident pulses appear at 22d and 22a. When a signal pulse passes through three consecutive channels, e.g., the channels that include antennas 10a, 10b, and 10c, the single pulse generators 14a, 14b, 14c each generate a pulse, which three pulses in part appear at one input of each of the coincidence circuits 16a, 16b, 16c, respectively, and in part pass through the multi-pulse synchronizer and appear at the inputs 22a, 22b, 22c of ambiguity eliminator 22. The ambiguity eliminator delivers a pulse at 22b' only whereby coincidence circuit 16b only receives overlapping pulses at its two inputs to activate the signal utilization means 18b. Ambiguity eliminator delivers an output pulse at 22b' only when coincident pulses appear at 22a, 22b, 22c; it delivers an output pulse at 22c' only when coincident pulses appear at 22b, 22c, 22d; it delivers an output pulse at 22d' when coincident pulses appear at 22c, 22d, 22a; it delivers an output pulse at 22a' only when coincident pulses appear at 22d, 22a, 22b.

Where the series of antennas 10 comprises a closed sequence, i.e., 360 degree detector, the antennas number an integral multiple of four. To illustrate the reason that this must be so, assume that the closed sequence of antennas numbered nine as in FIG. 1. If a signal passed through the consecutive antennas 10a, 10h and 10j, the signal utilization means 18j, the center one of the three, must be activated for correct operation, but this would not occur; instead the signal utilization means 18h would be activated.

Figure 2:
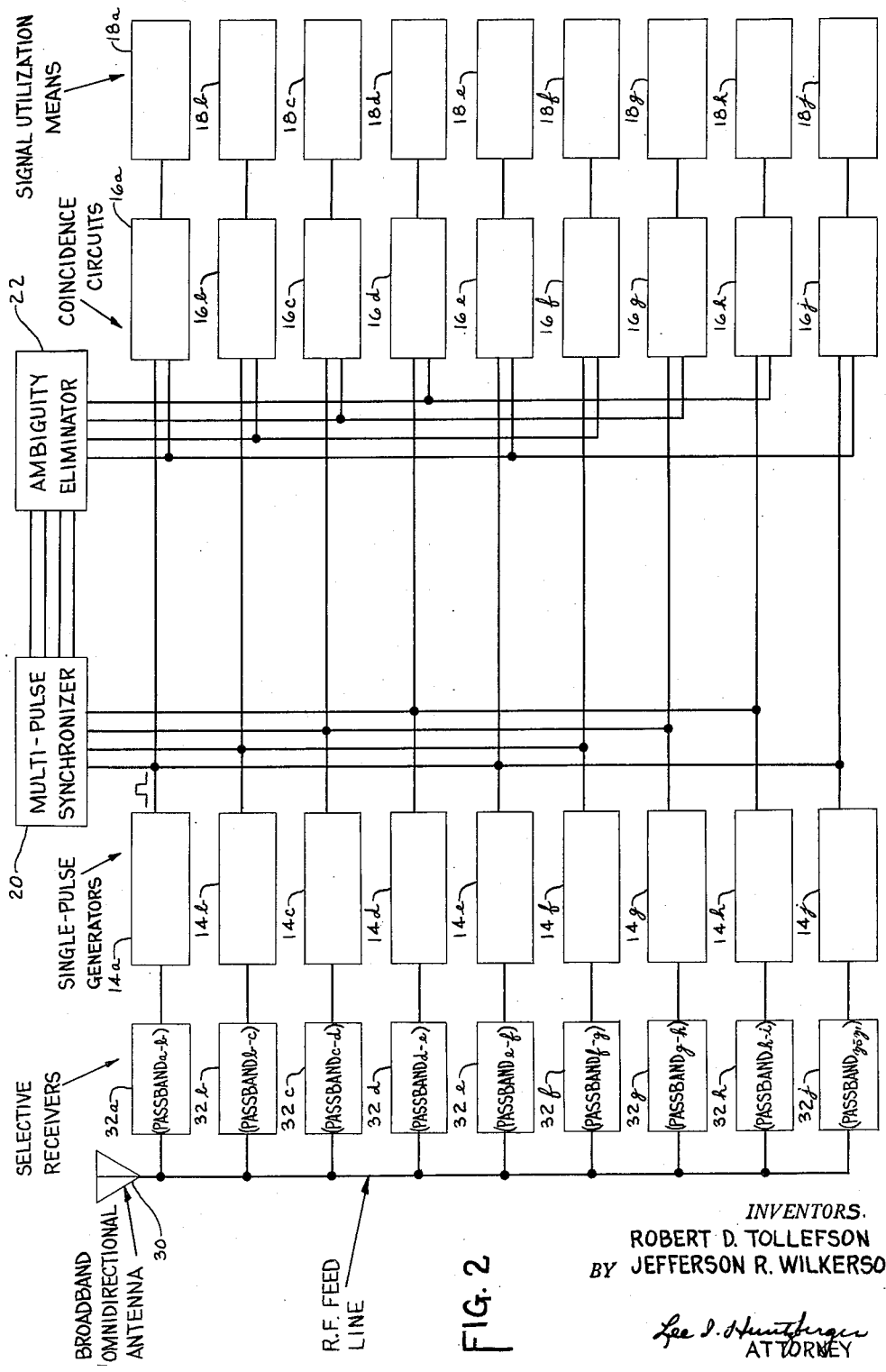

The system illustrated in FIG. 2 is similar to that in FIG. 1. Instead of broadband directional antennas 10a–10j and broadband receivers 12a–12j as in FIG. 1, the system illustrated in FIG. 2 includes a broadband omnidirectional antenna 30 and frequency selective receivers 32a–32j. The other circuit devices in FIGS. 1 and 2 are the same. Whereas the antennas 10 in FIG. 1 are direction sensitive, the antenna 30 in FIG. 2 is not directionally sensitive; whereas the broadband receivers 12 in FIG. 1 are not frequency selective, the receivers 32 in FIG. 2 are frequency selective, their passbands being sequential, successive passbands overlapping. The two systems operate in the same manner except that the system in FIG. 1 is direction selective and the system in FIG. 2 is frequency selective.

Figure 3:
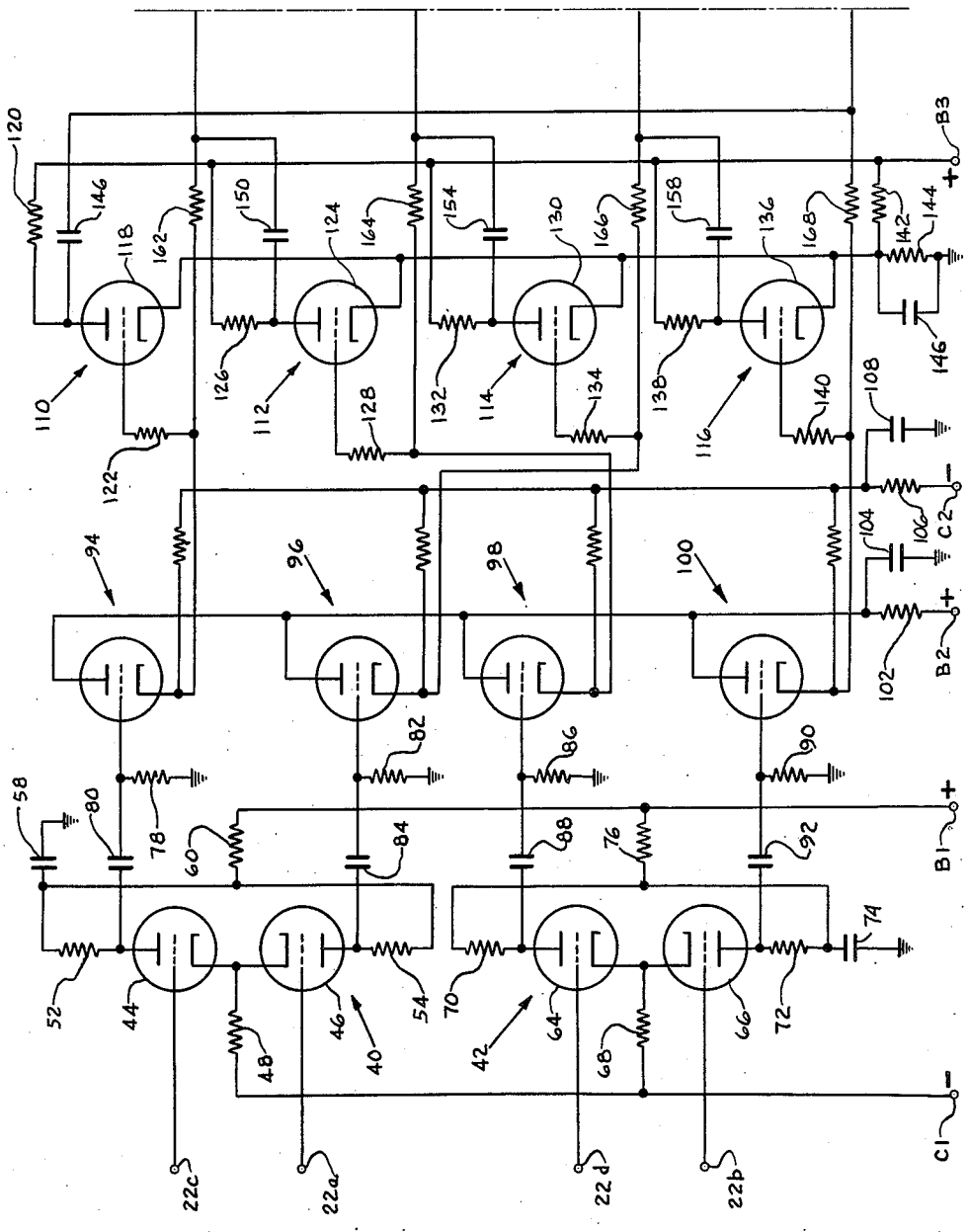

An embodiment of the ambiguity eliminator 22 for use in the systems illustrated in FIGS. 1 and 2 is illustrated in FIGS. 3 and 4. A direct current power supply, not shown, provides positive potentials at terminals B1, B2, B3, etc. and negative potentials at terminals C1, C2, C3, etc. relative to a common reference potential indicated by the symbol for ground. The input stages of the circuit are subtract or difference stages 40 and 42. The difference stage 40 includes triodes 44 and 46 having a common cathode resistor 48 terminating at negative terminal C1. Plate resistors 52 and 54 are connected to the triodes 44 and 46 respectively and at their other ends are connected through decoupling network including condenser 58 and resistor 60 to positive terminal B1. The difference stage 42 includes triodes 64 and 66 having a common cathode resistor 68 terminating at negative terminal C1. Plate resistors 70 and 72 are connected to the triodes 64 and 66 respectively and at their other ends are connected through a decoupling network including condenser 74 and resistor 76 to positive terminal B1. To the plates of the triodes 44, 46, 64, 66 are connected R.C. coupling circuits as follows: resistor 78 and condenser 80 to the plate of triode 44; resistor 82 and condenser 84 to the plate of triode 46; resistor 86 and condenser 88 to the plate of triode 64; resistor 90 and condenser 92 to the plate of triode 66. The D.C. bias at terminal C1 is operative to render the triodes 44, 46, 64, 66 normally conductive at a level substantially below saturation. When there is only one input pulse to the ambiguity eliminator 22, i.e. when a positive pulse is coupled into the grid of triode 44 only, a negative pulse is developed across the resistor 78 and a positive pulse is developed across the resistor 82. When there are three input pulses to the ambiguity eliminator, i.e. when coincident positive pulses are coupled into the grids of triodes 44, 46 and 64, negative output pulses appear across resistors 78, 82 and 86 and a positive pulse appears across resistor 90. When there are two input pulses to the ambiguity eliminator, i.e. when coincident positive pulses are coupled into the grids of triodes 44 and 64, negative pulses appear across resistor 78 and 86 and positive pulses appear across resistors 82 and 90. The different stages 40 and 42 operate in response to three input pulses from three receiver channels in the receiver sequence in the system of FIG. 1 or FIG. 2 to ineffectuate the pulses from the two outer receiver channels. In the stages 40 and 42, negative pulses are generated in response to input pulses to the two outer ones of the three receiver channels receiving coincident pulses, and as described below, the negative pulses generated in stages 40 and 42 are without effect because they are attenuated in the succeeding circuit elements. Only generated positive pulses are utilized. In the sense that the stages 40 and 42 play against each other the pulses from the two outer receiver channels, they are difference stages or subtract units.

Cathode followers 94, 96, 98, 100 are connected to signal coupling resistors 78, 82, 86, and 90 respectively. A decoupling network including resistor 102 and condenser 104 connects the plate circuit of the cathode followers to plate supply terminal B2. A decoupling network including resistor 106 and condenser 108 connects the cathode circuit of the cathode followers to terminal C2. The bias on the cathode followers is such that they are normally conducting at a level substantially below saturation when there is no signal input thereto whereby the cathode followers are able to transfer both positive and negative signals to the succeeding circuit elements.

Whereas the circuit stages 40 and 42 are operative to eliminate ambiguity when there are coincident inputs to three of the terminals 22a–22d, amplifiers 110, 112, 114, and 116 serve to eliminate ambiguity when there are coincident inputs to two of the terminals 22a–22d. The amplifiers are direct coupled to the cathode followers 94, 96, 98 and 100 respectively. Amplifier 110 includes a triode 118, a plate resistor 120 and a grid resistor 122; amplifier 112 includes a triode 124, a plate resistor 126 and a grid resistor 128; amplifier 114 includes a triode 130, a plate resistor 132, and a grid resistor 134; amplifier 116 includes a triode 136, a plate resistor 138 and a grid resistor 140. The plate circuits of the amplifiers 110, 112, 114 and 116 are connected to the plate supply terminal B3. A voltage divider including resistors 142 and 144 are connected between power supply terminal B3 and ground; the cathode circuit of the amplifiers is connected to the junction of resistors 142 and 144. A bypass condenser 146 is connected across resistor 144. The voltage on grid and cathode of the amplifiers 110, 112, 114 and 116 causes the amplifiers to be normally cut off. Because the amplifiers are cut off, negative pulses from any of cathode followers 94, 96, 98 and 100 have no effect on the amplifiers. Each amplifier delivers a negative output pulse in response to a positive input pulse.

Condensers 146, 150, 154, 158 couple the plates of triodes 118, 124, 130, 136 to the cathode side of diodes 148, 152, 156 and 160 respectively; the anode sides of the diodes are connected to ground. Resistors 162, 164, 166, 168 are connected in series between the cathodes of cathode followers 94, 96, 98, 100 and the cathode of diodes 152, 156, 160 and 148 respectively. When two coincident positive pulses appear at two of the input terminals, e.g., the terminals 22a and 22d, the following action occurs: positive pulses appear at the plates of triodes 44 and 66 and negative pulses appear at the plates of triodes 46 and 64. The four pulses pass through the cathode followers 94, 96, 98 and 100. The negative pulses at the output of cathode followers 96 and 98 do not go any further because the amplifiers 124 and 130 are biased beyond cutoff and do not respond to negative pulses; the diodes 156 and 160 prevent the negative pulses from reaching the succeeding circuitry. The positive pulses from cathode followers 94 and 100 are delivered in part to the amplifiers 110 and 116 respectively and in part to the resistors 162 and 168. When the positive pulse is delivered to amplifier 116 the latter produces a negative pulse which is coupled by condenser 158 to diode 160 which shunts it to ground. When the positive pulse is delivered to amplifier 110 the latter produces a negative pulse which is coupled by condenser 146 to the diode 148; the negative pulse from amplifier 110 and the positive pulse from cathode follower 100 arrive at opposite sides of resistor 168 and since the negative pulse is of greater amplitude the positive pulse from cathode follower 100 is blocked at resistor 168. However, the positive pulse from cathode follower 94 is not completely dissipated; the portion that passes the diode 152 activates the succeeding circuitry. The above-described action exemplifies what takes place when two coincident positive pulses arrive at two of the inputs 22a–22d, namely 22a and 22b, 22b and 22c, 22c and 22d, or 22d and 22a.

Four identical blocking oscillator circuits 170 are connected to the cathode sides of diodes 152, 156, 160, and 148 respectively. A blocking oscillator of the type disclosed is able to generate a narrow, steep-sided pulse each time it is pulsed and with substantially negligible delay which characteristics are functionally advantageous in the disclosed circuit. Each of the four blocking oscillator circuits includes an input triode 172, a three winding transformer 174, and an output triode 176. The plate of triode 172 is connected in series with primary 178 of transformer 174. An isolation network including a resistor 180 and condenser 182 connects the primary 178 to the terminal B4. A voltage divider including resistors 184 and 186 is connected between power supply terminal B4 and ground. The cathode of triode 172 is connected to the junction of resistors 184 and 186. The triode 172 is normally cut off by the cathode bias whereby no current flows in primary 178. When a positive pulse is delivered to the grid of triode 172, current flows through primary 178 for the duration of the positive pulse. The plate of triode 176 is connected to secondary 188. An isolating network including resistor 190 and condenser 192 connects the other end of secondary 188 to terminal B5. The grid of triode 176 is connected in series with the secondary 194 of transformer 174; the other end of secondary 194 is connected to a bias circuit; the bias circuit includes a voltage divider including resistors 196 and 198 connected between the negative terminal C3 and ground. A bypass condenser 200 is connected across resistor 198. An isolating resistor 202 is connected between the secondary 194 and the junction between voltage divider resistors 196 and 198. A grid condenser 204 is connected between the end of secondary 194 remote from the grid and the cathode of triode 176. A cathode load resistor 206 is connected to triode 176. Shunting the load resistor is a threshold circuit including diode 208, current limiting resistor 210, and the positive terminal B6. The triode 176 is normally nonconductive because the cathode is at ground potential and the grid is substantially negative.

When a positive pulse is delivered to the grid of triode 172, it conducts and plate current flows through primary 178 inducing sufficient voltage in secondary 194 to unbias triode 176. Triode 176 begins to conduct. As plate current starts to flow, the rising plate current in secondary 188 continues to induce voltage in secondary 194. The induced voltage in secondary 194 is impressed upon the grid of triode 176 through the grid capacitor 204 with a polarity that drives the grid more and more positive. The grid when driven positive with respect to its cathode, draws current, and electrons accumulate on the side of condenser 204 nearest the grid. When the plate current reaches saturation, the secondary 188 ceases inducing a voltage in secondary 194 and the triode 176 is cut off. During the interval that plate current flows through the triode 176, a positive pulse is developed across resistor 206 exceeding the potential at terminal B6 and is delivered to the terminal 22d'.

A blocking pulse generator 212 is coupled at its input end by condenser 214 to the end of resistor 210 remote from terminal B6 and at its output end to the cathodes of the input triodes 172. Current flows through resistor 210 when one of the blocking oscillators delivers its substantially undelayed steep-sided narrow output pulse. The blocking pulse generator is of the type that is normally inactive but generates a rectangular pulse each time it is triggered; the amplitude of the generated rectangular pulse is sufficient to cut off all four triodes 172 for the duration of the rectangular pulse. The blocking pulse generator 212 is triggered when current flows through resistor 210 which in turn occurs when one of the blocking oscillators 170 delivers an output pulse. The purpose of the blocking pulse generator is to prevent spurious outputs from the ambiguity eliminator circuit under the following conditions or similar conditions: if coincident pulses are delivered to terminals 22a and 22d and the pulse on 22d is wider or somewhat delayed relative to the pulse on 22a, complete blanking of the pulse entering at 22d would not occur at resistor 164 and diode 148. The remaining part would trigger the respective blocking oscillator thereby causing a spurious response. This problem is obviated by using the first output pulse from the blocking oscillators to trigger the blocking pulse generator 212; the blocking pulse generator cuts off the input triodes 172 for an interval sufficient to preclude spurious response due to difference in width between the input pulses to terminals 22 or difference in delay in the circuit or similar reasons.

Obviously many modifications and variations of the present invention are possible in the light of the above teachings. It is therefore to be understood that within the scope of the appended claims the invention may be practiced otherwise than as specifically described.

We claim:

1. A passive detector for detecting pulse signals of a selected class where the characteristic that distinguishes the class is quantitative in nature and the class encompasses a continuous range of that quantity between selected limits, which comprises: a plurality of pulse receiving units that are sensitive to pulses of said class and are related in an operational sequence in that each unit is sensitive to a part only of the class and the parts are contiguous sequential parts respectively of said class and together comprise all of said class, each unit being operable in response to an incoming signal pulse in the part of the class to which it is sensitive and of sufficient amplitude to be activated thereby to deliver at its output side a shaped single pulse, a corresponding plurality of signal utilization devices, each signal utilization device corresponding to one only of said signal receiving units, and means coupled to the input sides of said signal utilization devices and to the output sides of said signal receiving units and operable when only one unit is activated by an incoming signal pulse to activate the signal utilization device corresponding thereto, and operable when any two units for two contiguous parts of the class are activated by one incoming signal pulse to activate only the signal utilization device corresponding to that one of the two activated units that is sensitive to the part of the class which is foremost of the two contiguous parts in a selected direction along the sequence of parts, and operable when any three units for three contiguous parts of the class are activated by one incoming signal pulse to activate only the signal utilization means corresponding to that one of the three units that is sensitive to the central one of the three contiguous parts.

2. A passive detector for pulse signals as defined in claim 1 wherein said selected class is characterized by a selected frequency range and said plurality of pulse receiving units are sensitive to contiguous sequential parts of said frequency range.

3. A passive detector for pulse signals as defined in claim 1 wherein said selected class incompasses pulse signals arriving at the detector from a selected geometric field and said plurality of pulse receiving units are sensitive to overlapping contiguous sequential parts of said geometric field.

4. A passive detector for detecting pulse signals of a selected class where the characteristic that distinguishes the class is quantitative in nature and the class encompasses a continuous range of that quantity between selected limits, which comprises: a plurality of pulse receiving units that are sensitive to pulses of said class and are related in an operational sequence in that each unit is sensitive to a part only of the class and the parts are contiguous sequential parts respectively of said class and together comprise all of said class, each unit being operable in response to an incoming signal pulse in the part of the class to which it is sensitive, to deliver at its output side a single predetermined-shaped pulse; a corresponding plurality of utilization devices coupled to said units respectively and having in series in each coupling an individual coincidence circuit operative to produce an output pulse to activate its respective utilization device in response to two coincident input pulses, each pulse receiving unit when activated delivering one of the two pulses needed by its respective coincidence circuit to be rendered operative, means coupled to the output sides of said units and to said coincidence circuits and operable when only one unit is activated by an incoming signal pulse to deliver to the coincident circuit coupled to the activated unit the other of the two coincidence pulses needed by the coincidence circuit for it to produce an output pulse to activate its respective utilization device, said means being operable when any two units for two contiguous parts of said class are activated by an incoming signal pulse to deliver only to the coincidence circuit coupled to that activated unit sensitive to the part of the class foremost in a selected direction along the sequence of parts the other of the two coincident pulses needed for it to produce an output pulse to activate its respective utilization device, said means being operable when any three units for three contiguous parts of the class are activated by an incoming signal pulse to deliver only to the coincidence circuit coupled to that activated unit sensitive to central one of the three parts of the class the other of the two coincident pulses needed to enable it to produce an output pulse to activate its respective utilization device.

5. A passive detector apparatus for pulse signals of a selected class where the characteristic that distinguishes the class is quantitative in nature and the class encompasses a continuous range of that quantity between selected limits comprising: $n$ signal pulse receiving units that are sensitive to pulses of said class and are related in an operational sequence in that each unit is sensitive to a part only of the class and the $n$ parts are overlapping contiguous sequential parts respectively of said class and together comprising all of said class, $n$ being at least four, each of said pulse receiving units in response to a signal pulse to which it is sensitive, operating to generate and deliver a steep-sided single pulse of predetermined width and amplitude, $n$ signal utilization means, $n$ coincidence circuits each having two inputs and one output for providing an output pulse in response to two coincident pulses at its two inputs, said $n$ coincidence circuits being coupled at their outputs to said $n$ signal utilization means respectively, one input of each of said coincidence circuits being coupled to the output side of the respective signal receiving means whereby when a pulse is generated by a pulse receiving unit in response to a signal pulse in that part of the range to which it is sensitive the generated pulse is transmitted to the one of said coincidence circuits that is coupled to the signal utilization means corresponding to that signal pulse receiving means, a multi-pulse synchronizer having four inputs and four corresponding outputs and operative in response to an input pulse to one of the inputs to provide an output pulse at the corresponding output and operative in response to either two or three substantially coincident input pulses to a corresponding number of the inputs to provide synchronized pulses at the corresponding outputs, each of the inputs of said multi-pulse synchronizer being connected to four mutually exclusive groups of said pulse receiving means wherein each group includes pulse receiving means that are sensitive to those parts of said class spaced along the sequence of parts in four part steps, an ambiguity eliminator having four inputs and four corresponding outputs, the four inputs of said ambiguity eliminator coupled to the outputs of said multipulse synchronizer whereby the four outputs thereof correspond to the four groups of pulse receiving means respectively, and operable when a single signal pulse triggers one only of said pulse receiving units to generate a pulse at the corresponding output only, and operable when a single signal pulse triggers two of said pulse receiving units for two contiguous parts to generate a pulse at that output corresponding to that one of the two parts foremost in a predetermined direction along the sequence of parts, and operable when a single signal pulse triggers three of said pulse receiving units to generate a pulse at the output corresponding to the center one of the three parts, the other input of each of said coincidence circuits being coupled to that one of the outputs of said ambiguity eliminator whereby the two inputs of any of said coincidence circuits can receive two coincident pulses originating at the corresponding pulse receiving means, whereby said ambiguity eliminator precludes activation of more than one of said utilization devices from one signal pulse.

6. A passive detector apparatus as defined in claim 5 wherein said range is a frequency range and said $n$ signal pulse receiving units are sensitive to $n$ contiguous overlapping sequential parts respectively of the frequency range.

7. A passive detector apparatus as defined in claim 5 wherein said range is a geometric range and said plurality of pulse receiving units are sensitive to overlapping contiguous sequential segments of said geometric range.

8. A passive detector apparatus as defined in claim 7 wherein said geometric range covers 360 degrees and $n$ is equal to a multiple of four.

9. In a passive detector for incoming pulse signals of a selected class where the characteristic that distinguishes the class of pulse signals is quantitative in nature and the class encompasses a continuous range of that quantity between selected limits, the detector being of the type where a plurality of pulse receiving units sensitive to pulses of said class are related in an operational sequence in that each unit is sensitive to a part only of the class and the parts are overlapping contiguous sequential parts respectively of said class and together comprising all of said class and wherein each unit generates an activating signal pulse for delivery to a corresponding signal utilization device in response to an incoming pulse signal to which it is sensitive, an improvement therein for precluding activation of more than one utilization device when a plurality of not more than three units sensitive to sequential overlapping and contiguous parts are activated by the same incoming pulse signal, which comprises the combination with said units and devices of means for receiving said activating signal pulses from a group of simultaneously activated units sensitive to contiguous sequential segments, synchronizing them and when any two sequential units are activated by a single incoming signal pulse passing a single activation pulse to the utilization device for that unit which is closer operationally to a selected limit of the class, and when any three of such units are activated by a single incoming signal pulse, passing a single activation pulse to the utilization device corresponding to the central unit of the three activated units; whereby an incoming pulse signal will activate one utilization device.

10. An ambiguity eliminator for use with a plurality of distinct monopulse sources that are related in an operational sequence whereby at a given instant one only of said sources may generate a pulse, or two of said sources adjacent in the operational sequence may each generate a pulse simultaneously, or three of said sources adjacent in the operational sequence may each generate a pulse simultaneously, said ambiguity eliminator operating for providing in response to a pulse from one only of said sources an output pulse corresponding to that source, for providing in response to two simultaneous pulses from two adjacent sources in the sequence one output pulse corresponding to the one of said two sources which is foremost in a predetermined direction along the sequence, and for providing in response to three simultaneous pulses from three adjacent sources in the sequence an output pulse corresponding to the central one of the three sources, said ambiguity eliminator comprising: two substantially identical pulse subtract units each having two inputs and two outputs operative in response to an incoming pulse to one only of the inputs to deliver a pulse at the corresponding output and in response to two simultaneous pulses to both inputs of one unit to deliver no output pulse at the corresponding outputs, a pair of cascaded pulse transfer devices coupled to each of the four outputs respectively of said two pulse subtract units whereby when a pulse is delivered at one output of said units the pulse passes through the leading one of the two cascaded devices coupled to that output without change of polarity and then in part passes through the succeeding one of the cascaded devices and appears as a pulse of opposite polarity and greater amplitude than the pulse appearing at the output of the leading one of the pair of cascaded devices, four pulse output circuits each coupled to the output sides of the four leading pulse transfer devices respectively and to the output sides of the four succeeding pulse transfer devices respectively in an order whereby each output circuit is coupled to one leading pulse transfer device corresponding to an output of one of the subtract units and to one succeeding pulse transfer device corresponding to an output of the other subtract unit whereby each of said output circuits provides an output pulse only when there is a pulse from the leading pulse transfer circuit to which it is coupled and no pulse from the succeeding pulse transfer circuit to which it is coupled.

11. An ambiguity eliminator as defined in claim 10 further including a blanking pulse generator coupled between all the input sides in common and all the output sides in common of said four pulse output circuits whereby when one of said pulse output circuits provides an output pulse said output circuits are blanked for a predetermined interval thereafter to preclude more than one output pulse from said ambiguity eliminator in response to a plurality substantially simultaneous input pulses thereto that may differ somewhat in length or that may be delayed by somewhat different extents.

12. An ambiguity eliminator as defined in claim 10 wherein each of said pulse subtract units is a difference amplifier having two triodes with a common cathode resistor and a plate load resistor for each triode and bias means connected in the cathode circuit of said triodes whereby they are normally conducting, whereby when a positive pulse is delivered to one grid of said two triodes a negative pulse is delivered by the plate of that triode and a positive pulse is delivered by the plate at the other triode, and whereby when two positive pulses are delivered to the respective grids of said two triodes substantially simultaneously there is negligible output from said unit; each of said cascaded pulse transfer devices including a cathode follower as the leading device and a normally cut off polarity-reversing amplifier for accepting positive pulses only as the succeeding device, whereby in response to a positive pulse to a pair of cascaded pulse transfer devices the leading device delivers a positive pulse and the succeeding device delivers a negative pulse of substantially greater amplitude than the pulse from the leading device; each of said four pulse output circuits including a diode at the input side thereof for bypassing negative pulse inputs whereby a negative pulse from a cathode follower does not trigger an output circuit.

13. In combination with a plurality of monopulse sources related in an operational sequence whereby at a given instant one only of said sources may generate a pulse, or two of said sources adjacent in the operational sequence may each generate a pulse simultaneously, or three of said sources adjacent in the operational sequence may each generate a pulse simultaneously, an ambiguity eliminator for providing in response to a pulse from one only of said sources an output pulse corresponding to that source, for providing in response to two simultaneous pulses from two adjacent sources in the sequence an output pulse corresponding to the one of said two sources which is foremost in a predetermined direction along the sequence, and for providing in response to three simultaneous pulses from three adjacent sources in the sequence an output pulse corresponding to the pulse from the central one of the three sources, said ambiguity eliminator comprising: two substantially identical pulse subtract units each having two inputs and two outputs, each of said sources being coupled to one only of said inputs, all sources spaced apart along the sequence by an integral multiple of four sources being coupled in common to one input, the order of couplings between said sources and said inputs being such that among any adjacent four of said sequential sources one is coupled to an input of one unit and the succeeding one is connected to an input of the other unit and the next succeeding one is coupled to the other input of said one unit and the next succeeding one is coupled to the other input of said other unit, said units being operative in response to one incoming pulse to deliver a pulse at the corresponding output and operative in response to two simultaneous pulses from adjacent sources to an input of each unit respectively to deliver simultaneous pulses at the corresponding outputs and in response to three simultaneous pulses from adjacent sources to one input of one unit and both inputs of the other unit to deliver a pulse at the output corresponding to the input of the one unit and no pulse from the other unit, a pair of cascaded pulse transfer devices coupled to each of the four outputs respectively of said two subtract units whereby when a pulse is delivered at an output of said units it passes through the leading one of the two cascaded devices coupled to that output without change of polarity and then in part passes through the succeeding one of the cascaded devices and appears as a pulse of opposite polarity and greater amplitude than the pulse appearing at output side of the leading one of the air of cascaded devices, four pulse output circuits each coupled to the output sides of the four leading pulse transfer devices respectively and to the output sides of the four succeeding pulse transfer devices respectively but in a different order whereby each output circuit is coupled to one leading pulse transfer device corresponding to an output of one of the units and to one succeeding pulse transfer device corresponding to an output of the other unit whereby each of said output circuits provides an output pulse only when there is a pulse from the leading pulse transfer circuit to which it is coupled and no pulse from the succeeding pulse transfer circuit to which it is coupled.

References Cited in the file of this patent
UNITED STATES PATENTS

| | | |
|---|---|---|
| 2,105,537 | Kramar | Jan. 18, 1938 |
| 2,223,995 | Kotowski et al. | Dec. 3, 1940 |
| 2,489,304 | Marchand et al. | Nov. 29, 1949 |
| 2,931,032 | Newhouse | Mar. 29, 1960 |